United States Patent [19]

Bollella et al.

[11] Patent Number: 5,802,053
[45] Date of Patent: Sep. 1, 1998

[54] TRANSPORT GATEWAY BETWEEN A NATIVE NETWORK AND A MIXED NETWORK

[75] Inventors: Gregory Bollella, Carrboro; Kathleen Marie Hogan, Raleigh; Vachaspathi Peter Kompella, Cary; Alisa Lynn Morse, Durham; Diane Phylis Pozefsky, Chapel Hill; Soumitra Sarkar, Cary, all of N.C.

[73] Assignee: International Business Machines Corporation, Armonk, N.Y.

[21] Appl. No.: 543,252

[22] Filed: Oct. 13, 1995

[51] Int. Cl.⁶ .......................... H04L 12/66; H04L 29/06
[52] U.S. Cl. .......................... 370/401; 370/465
[58] Field of Search .................. 370/401, 402, 370/411, 465, 466, 467, 469, 471, 400, 403, 404, 405, 406

[56] References Cited

U.S. PATENT DOCUMENTS

| | | | |
|---|---|---|---|
| 4,893,307 | 1/1990 | McKay et al. | 370/466 |
| 4,914,571 | 4/1990 | Baratz et al. | 364/200 |
| 5,224,098 | 6/1993 | Bird et al. | 370/466 |
| 5,430,727 | 7/1995 | Callon | 370/401 |
| 5,491,693 | 2/1996 | Britton et al. | 370/401 |
| 5,586,261 | 12/1996 | Brooks et al. | 395/200.02 |

*Primary Examiner*—Chi H. Pham
*Assistant Examiner*—Ricky Q. Ngo
*Attorney, Agent, or Firm*—Jeanine S. Ray-Yarletts

[57] ABSTRACT

In order to more fully support the need to interconnect dissimilar networks, methods and apparatus are set forth which allow a transport gateway between a native (SNA/APPN) network and a mixed or non-native network to preserve the dynamic functions of the native network. The functions of fully dynamic directory and route selection are supported, in addition to the ability to use parallel gateways when connecting a native network to a mixed network. The ability to route information through a gateway from a dependent LU requester in a non-native network to a dependent LU server in a SNA/APPN network is also demonstrated. This allows concatenation of native and non-native networks while maintaining the addressability and accessibility of the native network.

9 Claims, 9 Drawing Sheets

TRANSPORT GATEWAY BETWEEN A NATIVE NETWORK AND A MIXED NETWORK

RELATED APPLICATIONS, PATENTS AND PRIOR ART

This application is related to our own, commonly assigned patents, U.S. Pat. No. 5,224,098, entitled "Compensation for Mismatched Transport Protocols in a Data Communications Network", U.S. Pat. No. 5,361,256, entitled "Protocol Selection and Address Resolution for Programs Running in Heterogeneous Networks", and our own, commonly assigned, currently allowed application Ser. No. 08/189,816 filed Feb. 01, 1994 now U.S. Pat. No. 5,491,693 which is a continuation of application Ser. No. 08/175,985 filed on Dec. 30, 1993 entitled "General Transport Layer Gateway for Heterogeneous Networks" now abandoned. The above stated patents provide a substantial foundation to and are prior art with respect to this application. U.S. Pat. No. 4,914,571 entitled "Locating Resources in Computer Networks" also provides additional foundation in the area of SNA (Systems Network Architecture) for this application and is prior art for this application. This application is also related to our own commonly assigned, copending application Ser. No. 08/336,948 filed on Nov. 10, 1994 entitled "Method and Apparatus for Interconnecting Networks" now U.S. Pat. No. 5,586,261.

U.S. Pat. No. 5,224,098 describes a Multi-Protocol Transport Networking (MPTN) Architecture which allows an application program running at one node in a network to communicate with a second application program running at another node in the network even where the application programming interface (API) assumes a different set of transport functions than those supported by the transport provider. In particular, it relates to a method for establishing communications, either connectionless or with a connection, between the applications and compensating for transport protocol mismatches if they arise.

U.S. Pat. No. 5,361,256 relates to address resolution and protocol selection among multiple transport protocols for the applications and the nodes in the MPTN network.

Application Ser. No. 08/189,816 relates to an MPTN gateway which has no dependencies on the particular transport protocols running on the Single Protocol Transport Networks (SPTNs) being interconnected. It utilizes a common transport provider interface called a Gateway Services Protocol Boundary (GSPB) between the SPTN transport protocols and the gateway components. The MPTN gateway supports connections between end systems across multiple intermediate networks. The MPTN gateway provides automatic routing based on dynamic participation in the routing protocols of the interconnected SPTNs so that any number of gateways may be interconnected and in any topology desired. It supports both MPTN nodes and gateways and non-MPTN nodes and gateways.

U.S. Pat. No. 4,914,571 describes the implementation of the LOCATE processing for APPN. It describes the changes in APPN over sub-area SNA for location of resources and routing of information.

Application Ser. No. 08/336,948 describes the implementation of dependent logical unit server (DLUS) and dependent logical unit requester (DLUR) on an APPN (Advanced Peer-to-Peer Networking) network. It describes a method of permitting dependent Logical Unit (LUs) (LUs that can not establish sessions by themselves, they need a server) to run over an APPN network.

BACKGROUND AND PRIOR ART

As communications networks have evolved, independent suppliers of computer hardware and software have developed different, incompatible formats and protocols for transporting data through the communications networks. Examples of well-known communications protocols include Systems Network Architecture (SNA), Digital Network Architecture (DECnet), Transmission Control Protocol/Internet Protocol (TCP/IP), Network Basic Input Output System (NetBIOS) and Open Systems Interconnect (OSI). Other communications protocols also exist and are widely used.

As networks have grown, and particularly as local area networks have come into widespread use, many organizations have ended up with conglomerations of individual networks running different networking protocols. For example, a single organization may have dozens of networks running many different networking protocols. This heterogeniety complicates the network communication as distributed programs are generally written for a particular application programming interface (API) which requires a specific networking transport protocol and can, therefore, only communicate over limited parts of the complete network.

If a mismatch exists between the transport protocols required by the particular API for a company's application program, and the transport protocols actually implemented in one or more of the networks on which the company would like to transport the application data, compensation between the API and the network is required.

In addition, there are addressing problems associated with the heterogeneous networks. A program today identifies itself and finds its partners using addresses associated with a particular networking protocol. In order for the program to operate over multiple, different networking protocols, a mechanism is needed to bridge the gap between the specific address set used by the program and the address sets used by the networking protocols. In particular, program independence from specific networking protocols requires a transport-independent mechanism for finding the source and destination application programs and the corresponding available transport protocols.

Since many programs already exist using existing address formats, it is not feasible to require all programs, including those in existence, to use a single standard address format. Likewise, it is not feasible to change all existing transport protocols to support the complete list of address formats used by application programs or to use a single standard format.

One of the more complicated architectures which is addressed in this application is APPN (Advanced Peer-to-Peer Networking). Further information on APPN may be found in "Systems Network Architecture Advanced Peer-to-Peer Networking Architecture Reference", IBM Publication number SC30-3422-003.

FIELD OF THE INVENTION

Many of the noted problems have been solved in the U.S. Patents or the pending U.S. Patent applications mentioned above but a significant gap still exists in that MPTN transport gateways support the concatenation of diverse networks with partner applications running on different networks, but do not fully maintain the characteristics of a SNA/APPN network when attaching to a non-SNA network. This application relates to methods of transporting information across conglomerations of networks containing many different protocols. More specifically, this application deals with a method and apparatus for maintaining the dynamic addressability and search capabilities of APPN across a multi-protocol network as well as the ability to route traffic through a gateway to a non-SNA network, from a dependent LU server to a dependent LU requester.

SUMMARY OF THE INVENTION

This invention solves the problem of preserving the functions of fully dynamic directory and route selection and the ability to use parallel gateways when connecting a native (SNA) network to an MPTN network in addition to allowing the routing of information from a dependent LU requester through a gateway to a non-SNA network to a dependent LU server in the SNA network. In particular, it addresses connecting a native SNA/APPN network to a non-SNA network (e.g., IP, IPX or NetBIOS network) for the support of all SNA applications. In this specification, all references to a native network refer to a SNA/APPN network. The solution implements a fictitious control point (CP) name(s) for each non-native network attached through the gateway(s), indicating that the gateway(s) is functioning as an intermediate routing node(s), and utilizing standard APPN transport mechanisms to exploit the fictitious CP name to route the information across the non-native network to the gateway from which it (the gateway) can route into the non-native network with non-native protocols. In addition, a fictitious connection network name is established to allow the support of a dependent LU requester in the non-native network to communicate with a dependent LU server in the SNA network in order to establish a dependent LU session across the networks.

DETAILED DESCRIPTION OF THE PREFERRED EMBODIMENT

Figure 1:
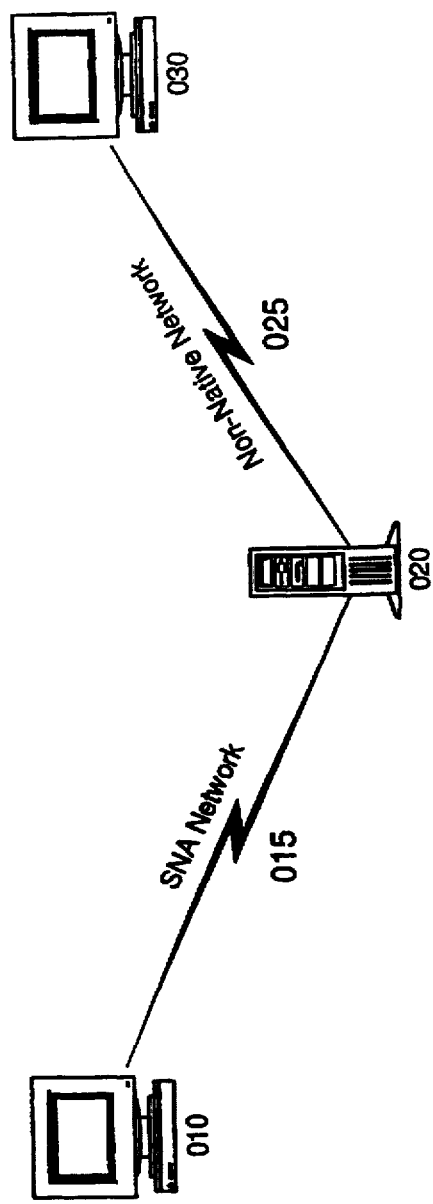
FIG. 1 is an example of a network in which this invention is implemented.

FIG. 1 is a sample network in which this invention is implemented. Device 010 represents any one or more pieces of computer equipment which contains at least one LU. Device 010 is connected to an SNA Network(015) which is in turn connected to a piece of computer equipment which contains a gateway(020). This gateway(020) is then connected to a Non-Native e.g. IP Network(025) which is connected to another piece of computer equipment containing at least one LU(030).

FIG. 1 also demonstrates the flow of traffic through a simplified network. Device 010 contains a node, say node1, which has an SNA application running. The SNA application produces information in a standard SNA format. This information is transmitted along the SNA network(015) to the MPTN gateway(020). Upon reaching the MPTN gateway (020), the gateway transforms the information and transports it across the non-native network(025) to the device at the other end (030) which also contains a node, say node2, running an SNA application. The application in node2 will then interpret and use the information.

Figure 2:
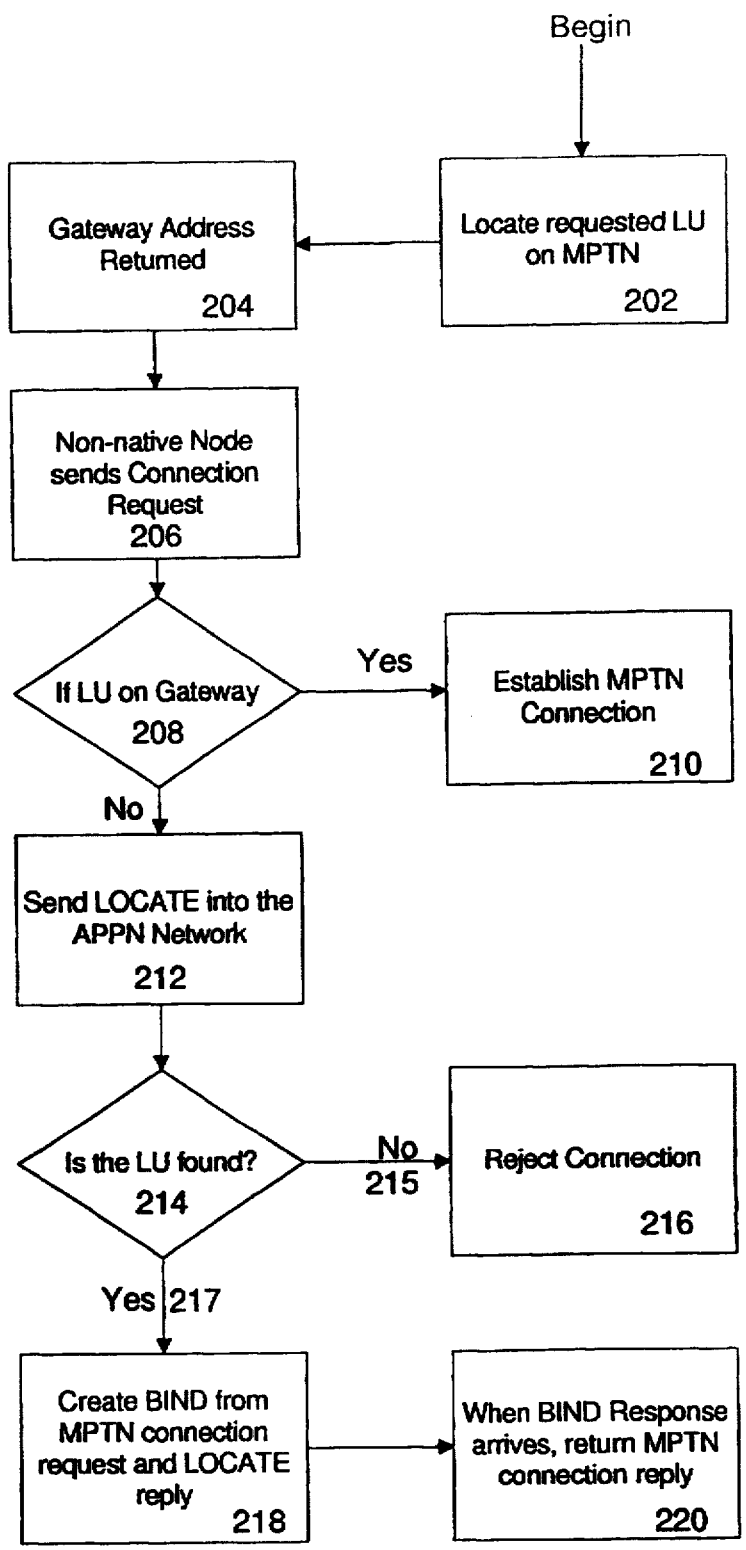
FIG. 2 demonstrates the logic necessary to create a connection from a non-native network to a native network.

FIG. 2 describes the connection setup from a non-native network to a native network. First the non-native node uses an MPTN address mapping mechanism to find the location of the requested LU (202). Next, this mechanism returns the address of the gateway to the requesting non-native node (204). The non-native node then sends a connection request for the desired LU to the gateway (206). If the LU is on the gateway (208) then the connection is established (210); otherwise the connection set-up request causes the gateway to send a LOCATE for the desired LU into the APPN network(212). The gateway waits for a reply from the APPN network indicating whether the LU is found in the network (214). If the LU is not found in the network(215), the connection is rejected(216). If the LU is found(217) in the network, a BIND is created from the information contained in the MPTN connection request, and the LOCATE response (218). The BIND is sent into the native network and the BIND response is returned to the gateway. When the BIND response is received, the MPTN connection reply is created and is returned(220) to the requesting node.

Figure 3:
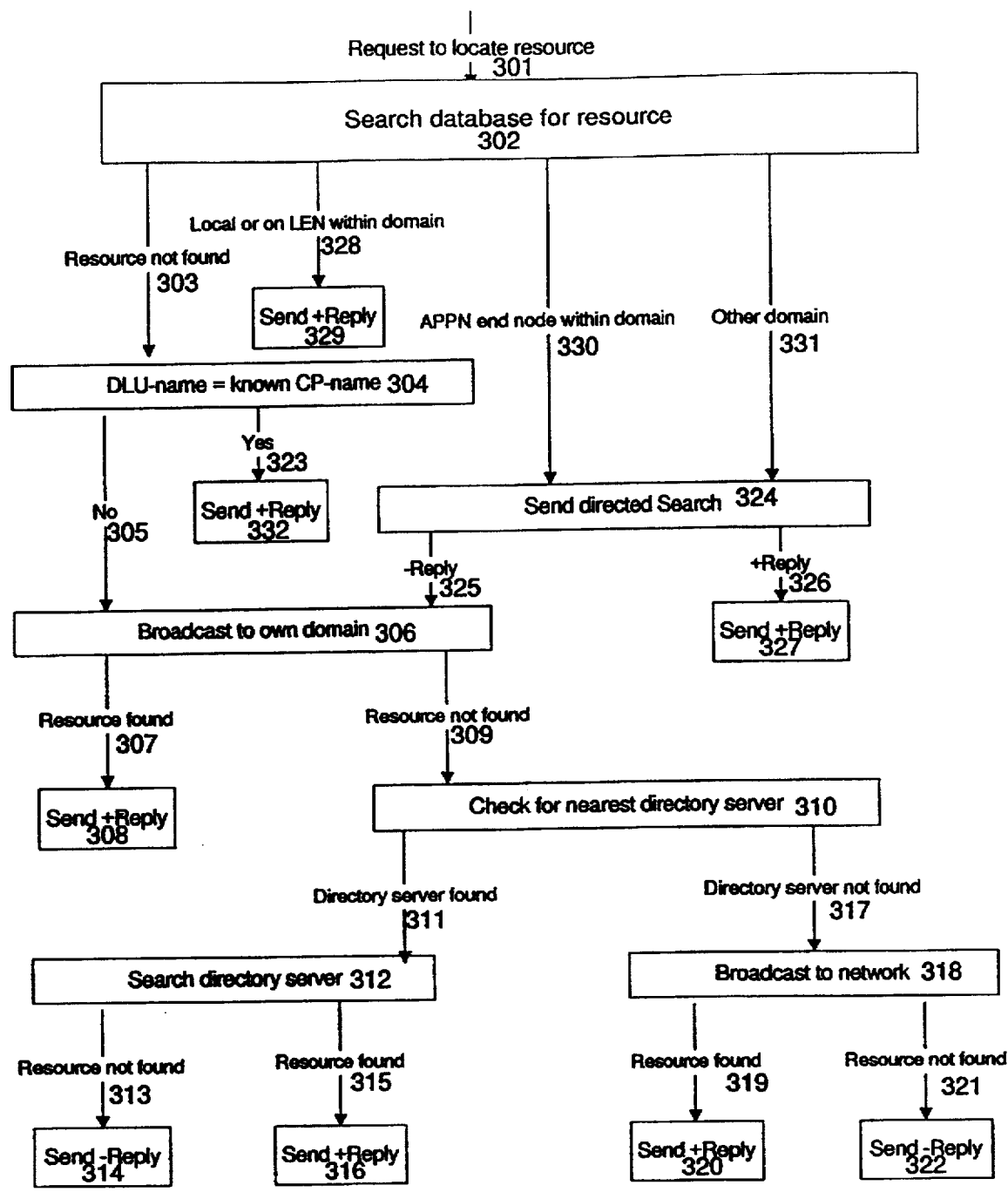
FIG. 3 is a prior art exposition of APPN directory function.

As shown in FIG. 3, the logic to locate a resource for APPN can be quite complex. A review of the standard APPN locate functions and terms is helpful at this point. APPN defines three types of nodes. For purposes of directory search, a network node (NN) is a node that fully participates in the directory search functions. An end node (EN) is a node with limited directory functions, to wit, it can initiate a search by asking a network node to locate an LU and, when asked, it can reply whether it contains the requested LU. A low entry network (LEN) node is a node that cannot participate in directory searches at all. All LEN node directory functions are handled for the LEN node by a NN. A NN and the ENs and LEN nodes it supports for searches is referred to as a domain. A NN contains a local database that contains the location of LUs: this includes all LUs residing on the NN and LEN nodes in its domain and a portion of the LUs in its ENs and in other domains. The latter LU information must always be validated before it can be used.

To initiate the locate processing, first the request to locate a resource is received by a network node (either locally generated or from an EN or LEN node)(301). A search of the local database is made for the resource (302). If the resource is not found (303), then a check is made to see if the destination LU name is a known CP name (304), if it is not (305), then a broadcast is made to the domain of the network node (306), if the resource is found (307), then a positive reply is returned to the requester (308). If the resource was not found in the broadcast (309), then a check is made for the nearest directory server (310). If a directory server is found (311), then a search is made of that directory server for the resource to be located (312). If the resource is not found by the directory server after its search process (313), which can include a broadcast to the network as in (318), a negative reply is returned to the requester (314); if the resource is found (315), a positive reply is returned to the requester (316). If, when the check was made for the nearest directory server (310), no server was found (317), then the LOCATE request is broadcast to the network (318). If the resource is found (319), a positive response is returned to the requester (320); if the resource is not found (321), a negative response is returned to the requester (322).

If, when the check is made to determine if the destination LU name is a known CP name (304), the answer is yes (323), then a positive reply is returned to the requester (332). If the reply to that directed search is negative (325), then a return is made to the path of doing a broadcast search of the local domain (306) and the path is traversed as before. If the reply to the directed search is positive (326), then a positive reply to the locate is returned to the requester (327).

If, when the search of the local database for the resource is issued (302), it is found that the resource to be located is a Local LU or on a LEN node within that domain (328), then a positive reply is returned to the requester (329). If, on the other hand, the resource was determined to be on an APPN end node within the domain (330) or in another domain (331), a directed search is sent (324) to the appropriate node and the path from (324) is traversed as before.

Some additional information on the APPN transport mechanism is helpful prior to describing the next figure. When multiple nodes are connected to a shared access facility (e.g., a local area network (LAN)), they are all in fact connected to each other. Rather than capturing the many connections thus enabled, APPN defines a virtual routing node (VRN) that represents the shared access facility. The VRN is not a true routing node but is given a control point name and is treated like any other routing node for route computations. The VRN and the shared access facility that it represents are referred to as a connection network.

In the present invention there are two models that are used by the gateway to define resources on the non-native network: the LU can appear to be on the fictitious LEN node with a fictitious CP having a link to each gateway (which appears as a NN) or it can appear to be connected to each gateway (NN) through the non-native connection network (CN). The fictitious CP name is a simpler model and is used for independent LUs (those that are able to set up connections without support from any other nodes). For dependent LUs (those that require assistance from dependent LU requesters and servers for session establishment) where DLUR-DLUS communication has knowledge of the real CP name or is cognizant of the individual nodes, this model does not suffice and the connection network model is used. The two basic aspects to this invention which utilize the above concepts are the dynamic support demonstrated in FIGS. 4 and 5 and the support for the non-native DLUR demonstrated in FIG. 6.

Figure 4:
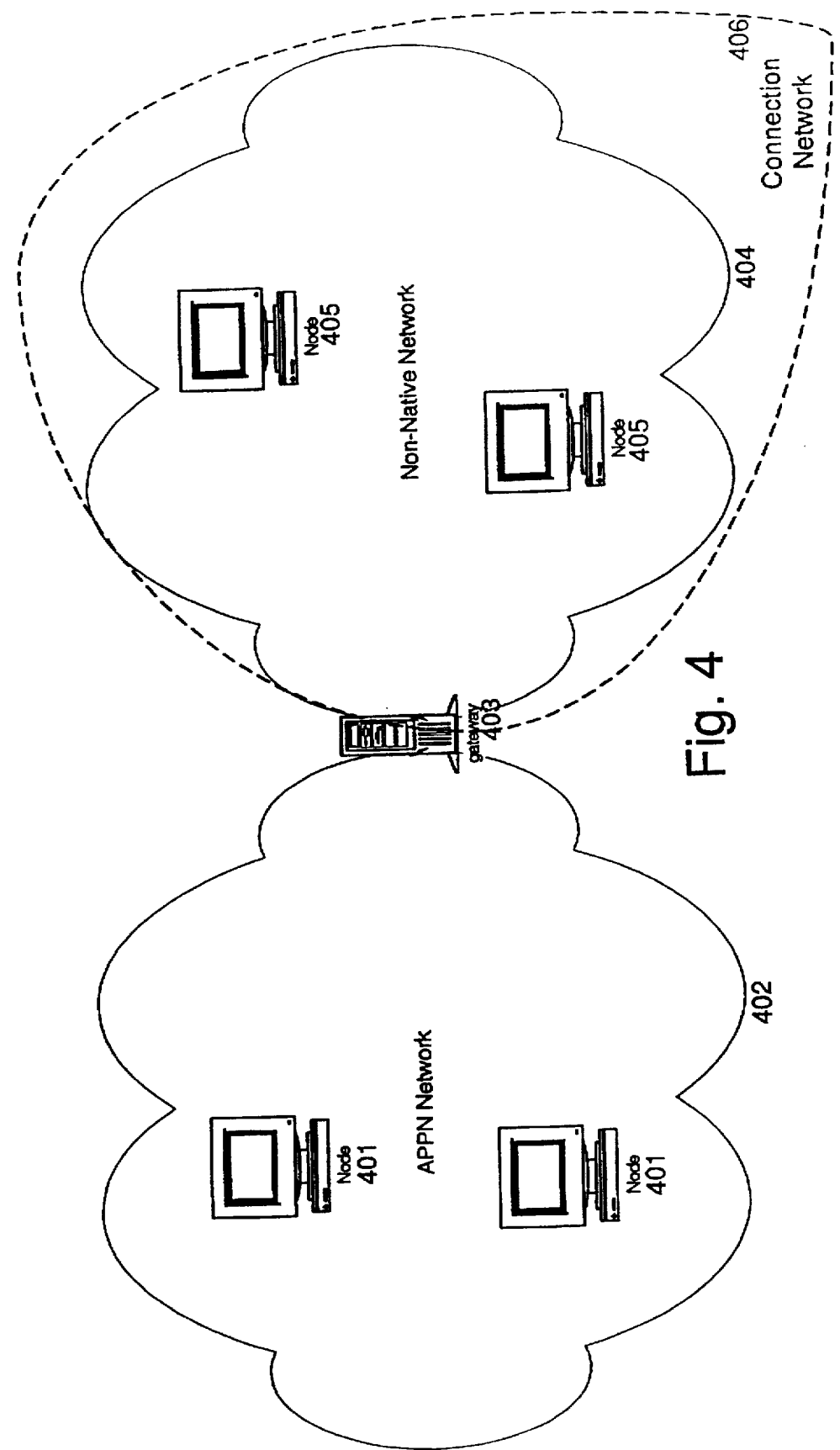
FIG. 4 shows the connection of an APPN network to a non-native network using a fictitious control point name and implementing intermediate routing nodes.

As shown in FIG. 4, in order to support the full dynamic directory and route selection capabilities of APPN, the MPTN gateway(403) appears as an intermediate routing network node to the rest of the APPN network(402) which includes one or more APPN nodes(401). When requests are initiated on the MPTN (non-native) side of the gateway, it appears to the rest of the APPN network as if the request was initiated at a low entry network (LEN) node behind the gateway (i.e. NN) and the normal processing procedures prevail. The gateway appears to the MPTN network(404) as an intermediate node that bridges two different networks and the network expects it to provide all networking functions on the non-MPTN portion of the network including support for dynamic directory and route selection.

When the requests are initiated on the native (APPN) side of the gateway, the requirement for supporting the full dynamic directory and route selection capabilities of APPN become more difficult. A quick review of the present APPN connection establishment technique is beneficial in understanding this situation. Within the APPN network, when an end node requires that a connection be established, it issues a LOCATE request for the desired LU to its supporting network node. A LOCATE reply is returned to the requesting network node with information about how to reach the destination beyond the topology that the network node knows. With this information, plus the known topology, a preferred route is selected.

In the present invention the shared-access transmission facility and the set of nodes(405) in the non-native network (404) having defined a connection to a common virtual routing node are said to comprise a connection network (406). The general model that is used by the gateway is that all LUs or nodes(405) in the non-native network are made to look as if they reside in a node for which the gateway(403) is the serving network node. The control point (CP) name of this node is a fictitious one. In the current implementation, when the non-native network is IP, this fictitious CP name is stored as address 127.0.0.3 in the reverse address table of the domain name server. The fictitious name for the connection network is also stored in the reverse address table at address 127.0.0.4. When reporting the location of an independent LU on the non-native network, each gateway will report that the LU is on the fictitious node and connected through the gateway. As would be evident to one skilled in the art, any unused or invalid address could be used to store these variables.

Figure 5:
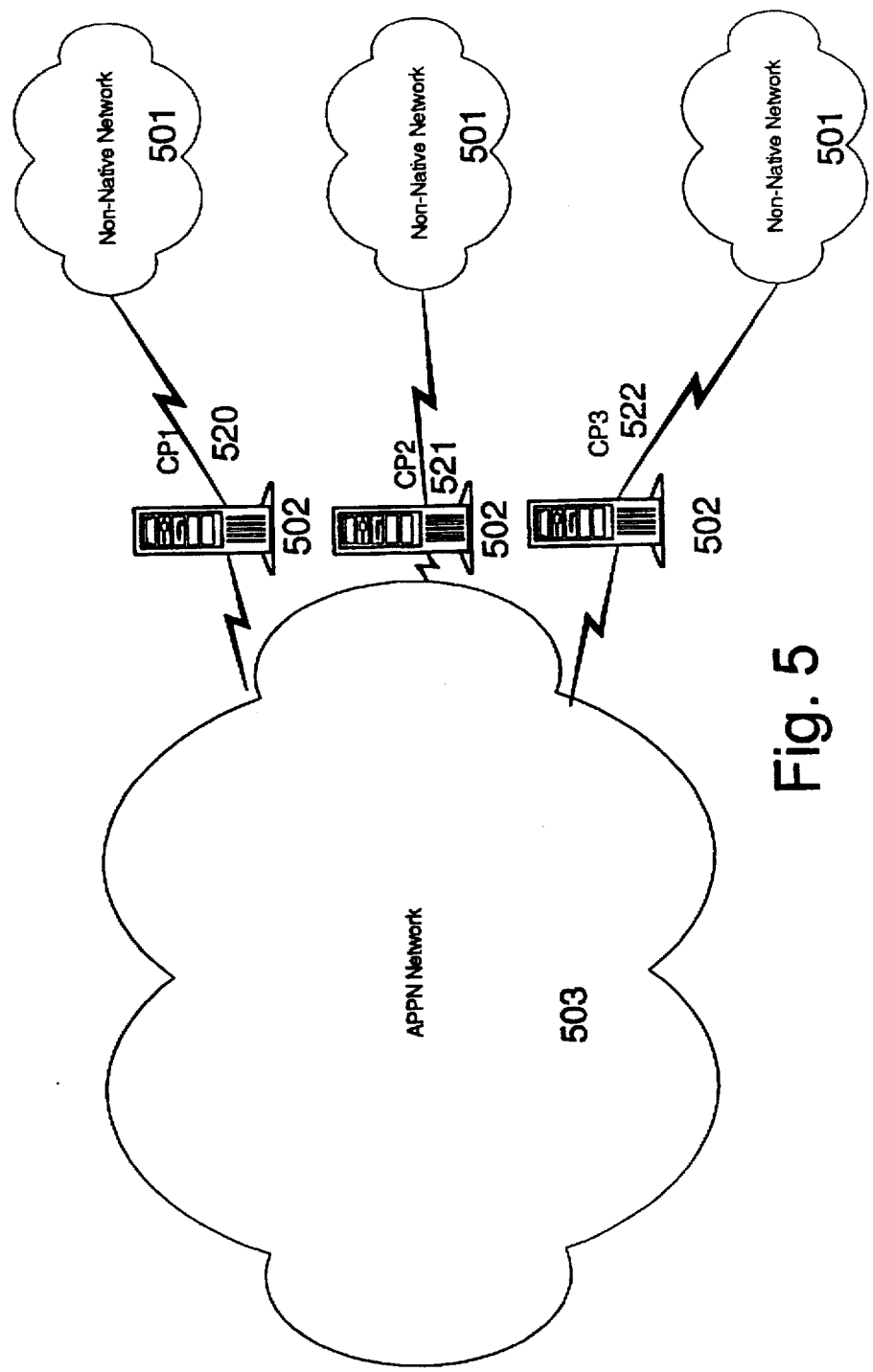
FIG. 5 further describes the implementation of the fictitious control points when multiple non-native networks are connected to the APPN network.

As shown in FIG. 5, when there are multiple unconnected non-native networks(501) connected through one or more gateways(502) to an APPN network(503), a unique CP name and Connection Network are defined for each non-native network(501) whether they use one or multiple gateways. In FIG. 5, CP1(520) is defined as the fictitious control point for one non-native network, CP2(521) is defined as the fictitious control point for a second non-native network, and CP3 (522) is defined as the fictitious control point for the third non-native network. A default fictitious CP name of $ANYNET.$GWCP is provided. However, only one non-native network that is accessible from a SNA network is allowed to use the default. When a non-default name is to be used, it is learned by the gateway(s)(502) using MPTN address mapping functions. For example, when the non-native network is IP, and when using a domain name server for address mapping, the CP name is mapped to the IP address 127.0.0.3 in the reverse address table. This is an arbitrarily chosen invalid IP address and one skilled in the art will realize that any otherwise unused address could be chosen.

Figure 5A:
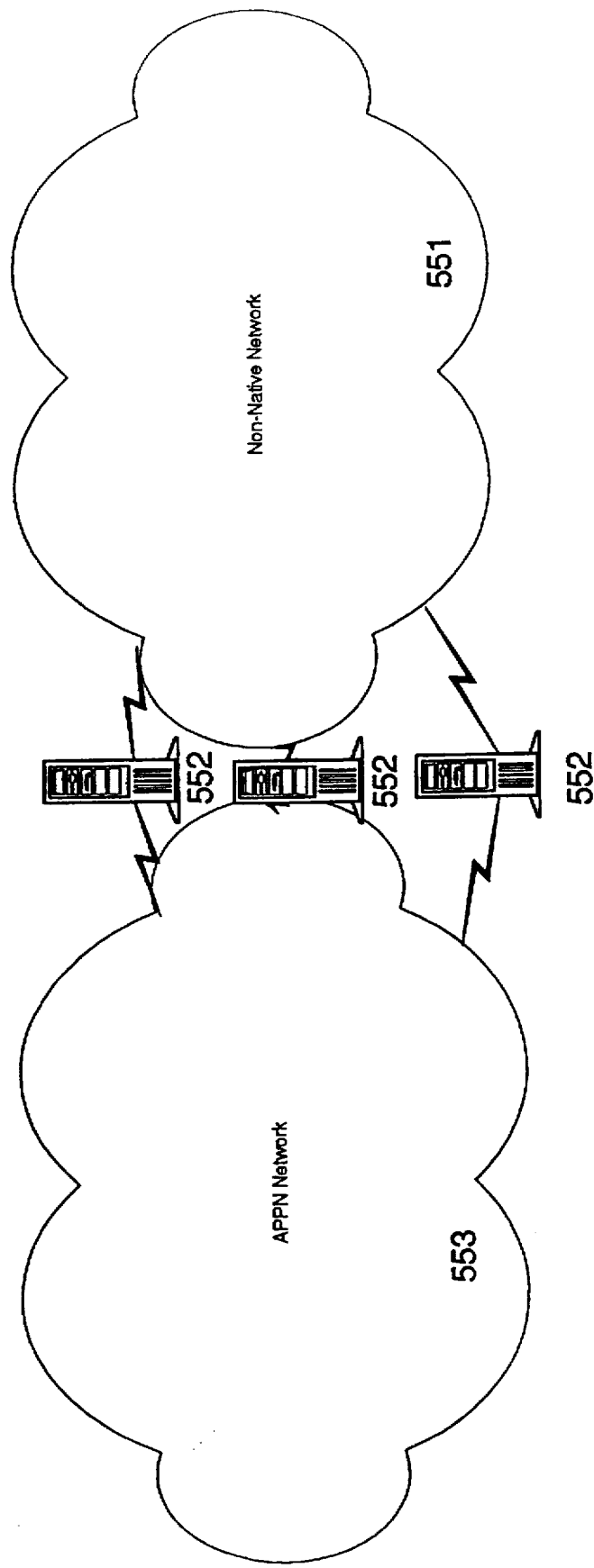
FIG. 5A demonstrates the use of multiple parallel gateways between a single native network and a single non-native network.

Another version of this invention is the use of multiple parallel gateways to connect a single native network to a single non-native network. This is shown in FIG. 5A. With this configuration, each of the parallel gateways (552) connecting the native network (553) to the non-native network (551) uses a single unique fictitious CP name. This is done to maintain connectivity in case one of the gateways (552) fails. As long as at least one of the gateways between the native network (553) and the non-native network (551) remains operative, the LUs will be able to be located and information will be able to flow between the networks.

There are two different methods the MPTN gateway uses to respond to a request for an LU that resides on the non-native network (which will be further described within), one for independent logical units (LUs) being on fictitious end nodes and one for dependent LUs being on fictitious connection networks. For independent LUs, when a LOCATE arrives at the gateway, it acts as a standard network node and checks with all of its end nodes for the requested LU. In this sense it treats the entire MPTN network to which it is attached as another end node. It uses the MPTN directory mechanisms to determine whether this LU is known. If it is, the gateway returns a positive LOCATE reply indicating that the LU is on a fictitious end node where all LUs on the IP network appear to reside. This provides support for the movement of LUs, also referred to as dynamic support.

Figure 6:
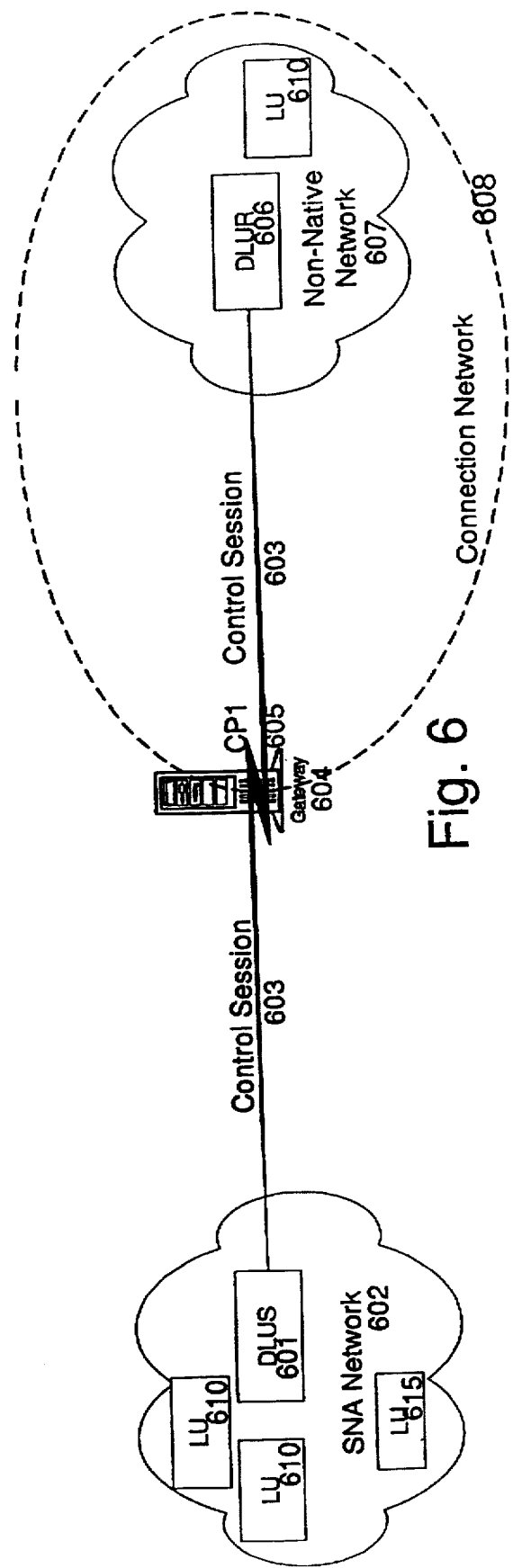
FIG. 6 depicts the connection network used in DLUS/DLUR support for APPN as well as the established control sessions.

MPTN also supports dependent LUs across a non-native network through the use of Dependent LU Server and Dependent LU Requester (DLUS/DLUR) which is further described in FIG. 6. In the DLUS/DLUR model, control sessions between the mainframe and the DLUR are carried on independent LU sessions. When a request for a connection to a dependent LU is received, the DLUS replies that it owns the LU.

Figure 8:
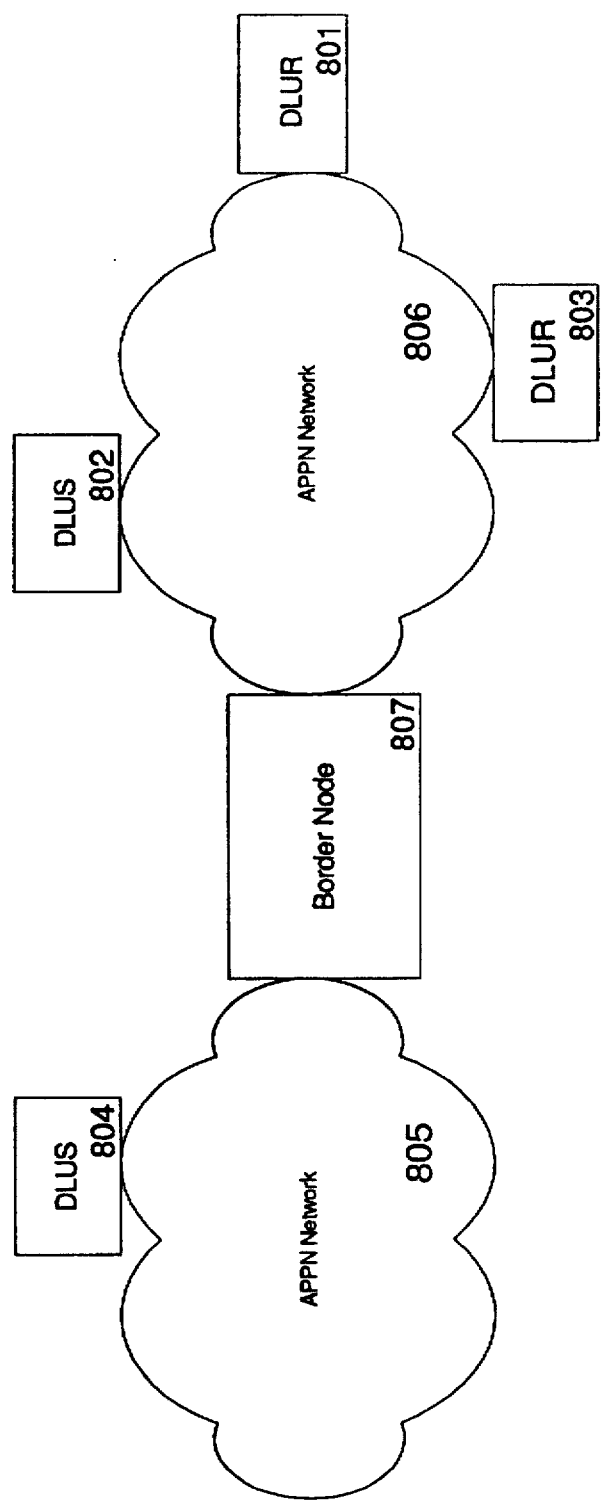
FIG. 8 demonstrates how a border node functions to do topology and routing.

FIG. 8 demonstrates prior art APPN route computation. In APPN, all network nodes share the topology of the network in order to compute routes. As networks grow, this topology can become too large for each network to maintain. In such a case, a border node (807) is added into the network to isolate portions of the topology (805 & 806). For routes that cross border nodes, the route must be computed in pieces, from the origin to a border node, from one border node to another or from a border node to a destination.

When the DLUS and DLUR are not separated by a border node (801 & 802), the connectivity information that is sent on the DLUR-DLUS control session is used to compute the route. When the two are separated by a border node (803 & 804), the additional connectivity information is of no use to the DLUS component as it has no knowledge of the network topology to which the DLUR is connected. In this case, when the connection is to be established, the border node will compute the route by sending out a LOCATE with the Owning CP Respond Indicator (OCR) bit set.

For dependent LUs on an MPTN network, the DLUR on a non-native network indicates that it is on the fictitious connection network. A standard APPN network node will handle this as it does any other request by computing the preferred route based on the topology of the SNA network and the additional hop through the fictitious connection network to the end node.

As shown in FIG. 6, a situation of interest for this invention is when the DLUS(601) is in the SNA (native) network(602) and the DLUR(606) is in the non-native network(607) connected via the gateway (604). At set-up time for this configuration, the dependent LUs associate themselves with the fictitious Connection Network name that is stored at location 127.0.0.4 of the reverse address table. The gateway (604) also associates itself with the fictitious connection network. When a LOCATE for a dependent LU arrives at the gateway(604) from a requesting LU in the native network with the OCR bit off, the gateway will not reply to the request, as it is not the owner. Only the DLUS will reply. The dependent LU Server has an LU 6.2 session, also called a control session(603), with the DLUR (606) in the non-native network. Information passed on this session allows the requesting LU (615), to locate the target LU(610) via the DLUS(604). Once the target LU is located, a BIND is sent from the LU in the SNA(615) to the LU in the non-native network(610) via the gateway(604) and through the fictitious connection network(608).

There is one exception to the prior paragraph, when a request comes through a border node and the OCR bit is on (This bit indicates that a route is being computed rather than ownership being sought), the gateway will return a LOCATE FOUND. Recognizing whether to respond to a LOCATE requires that the gateway recognize whether the LU is independent or dependent. This is made possible by a new address mapping function introduced with this invention. The general MPTN mapping function returns user-specific data. For LUs, this data indicates whether the LU is dependent or independent. When the non-native network is IP and domain name system (DNS) is used for address mapping between SNA and IP, each dependent LU that can be reached through an SNA over TCP/IP gateway must be mapped twice in the DNS. One entry maps the dependent LU to its IP address, and the other entry maps the dependent LU to the invalid IP address 127.0.0.2. The mapping of the destination LU to 127.0.0.2 identifies it as a dependent LU. All dependent LUs are mapped to this address. As would be evident to one skilled in the art, any invalid or otherwise unused address could be used to store this information in alternative implementations, so long as it is done consistently.

Figure 7:
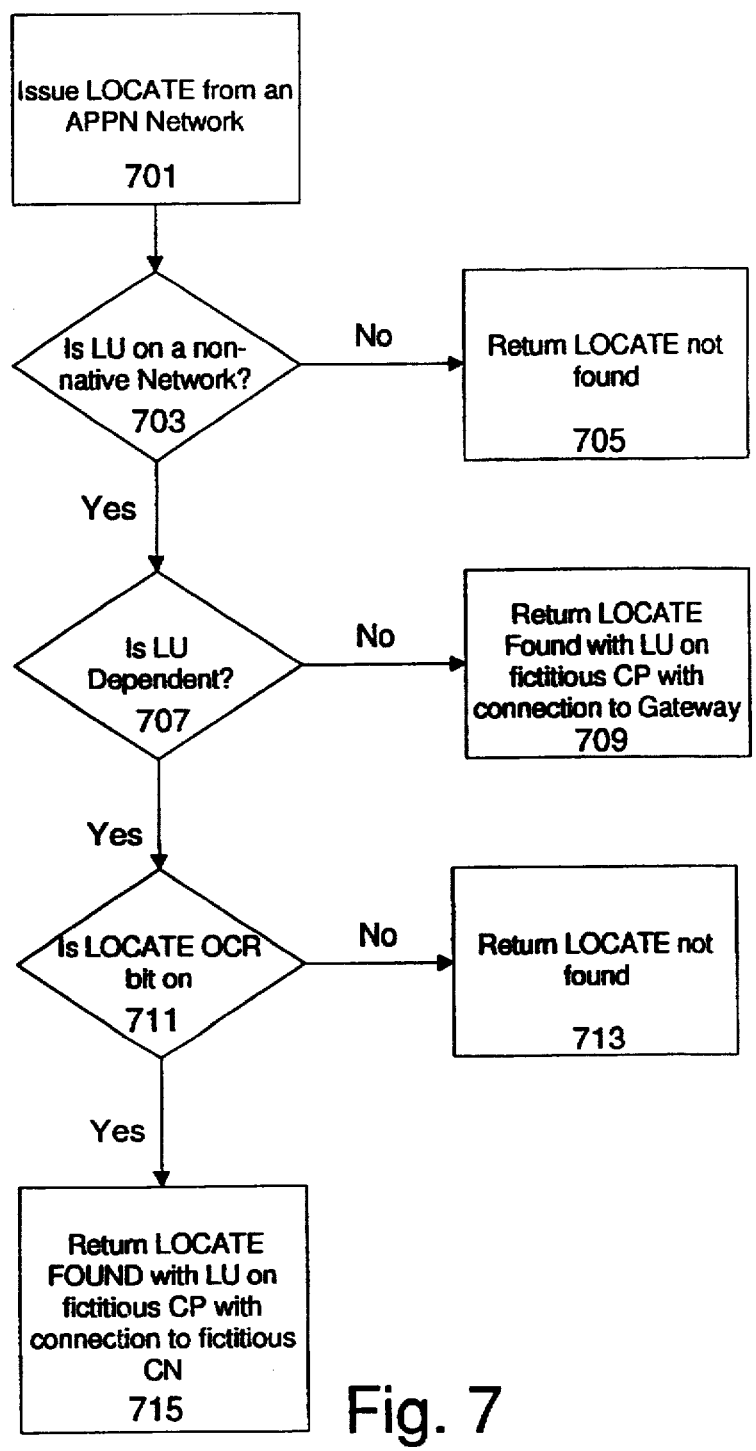
FIG. 7 demonstrates the logic used to process a LOCATE from an APPN network, for an LU in the non-native network.

Because the DLUS is a standard APPN component, it must be provided the information of how to reach the non-native LU in standard APPN fashion. All nodes on the non-native network with DLUR, and all gateways, report that they are on the fictitious connection network(608) when the DLUS is not separated from the DLUR through a border node. Across the DLUS/DLUR control session(603), the DLUR(606) passes connectivity information that indicates that it is accessible through the fictitious connection network (608). Because the gateway has reported this connection network(608) in the topology of the APPN network, normal route computation provides the preferred route to the dependent LU. As is the case with the fictitious CP name, if there are multiple disconnected non-native networks, the fictitious connection network name must be unique for each non-native network. As with the fictitious CP name, the name of the connection network is learned from the address mapping function or, when the non-native network is IP, through the use of the reverse address table definitions of the IP domain name system. In the case of parallel gateways, the procedure as described in FIG. 7 is followed for each gateway. Multiple positive replies will be received for the same LU, but they will all report that they are on the same connection network, located on the same end node.

When the DLUS(ie. 804) and DLUR(ie. 801) are separated by a border node(807), the route computation will be made by the border node. Like the DLUS component, the border node must be provided the information of how to reach the non-native LU in the standard APPN manner. All gateways report that they are on the fictitious connection network and the LOCATE with OCR indicator on is replied to with the information that the EN is on the fictitious connection network. With this information, normal route computation provides the preferred route to the non-native dependent LU.

FIG. 7 depicts the information flow for issuing a LOCATE from an APPN network. The LOCATE is issued from an APPN node (701). When the MPTN gateway receives the LOCATE it checks with the address mapping mechanism (703) to determine if the desired LU is on the non-native network. If it is not on the non-native network, then a negative response is returned to the LOCATE (705). If the LU is located on the non-native network, next it must be determined whether the LU is a dependent LU(707) again using the MPTN addressing mapping function. If it is not, a positive response to the LOCATE is returned(709) indicating that the LU was found on the fictitious CP with connectivity to the gateway. If the LU is dependent, then the OCR bit must be checked(711) to determine whether it is on. If it is not, then a negative response is returned for the LOCATE(713). If the OCR bit is on, then a positive response is returned to the LOCATE(715) including the fictitious CP name and connection network connectivity which indicates that the LU was found on the non-native node.

What is claimed is:

1. A method of routing information from an SNA/APPN network having standard APPN LOCATE functions through a gateway and across one or more non-native networks to a target node wherein said fictitious control point name is stored in an unused address location in an IP reverse address table, said method comprising the steps of: establishing a unique, fictitious APPN node having a control point name for each non-native network attached through said gateway; and, utilizing the standard APPN LOCATE functions to locate said target node utilizing said fictitious APPN node control point name to route information to said target node via said gateway and through at least one of said non-native networks to reach said target node.

2. A method as in claim 1, wherein said unused address is address 127.0.0.3 in the IP reverse address table.

3. A method of routing information from an SNA/APPN network having standard APPN LOCATE functions through a gateway and across one or more non-native networks to a target node, said method comprising the steps of:

establishing a unique, fictitious APPN node having a control point name for each non-native network attached through said gateway;

utilizing the standard APPN LOCATE functions to locate said target node utilizing said fictitious APPN node control point name to route information to said target node via said gateway and through at least one of said non-native networks to reach said target node; and indicating that each said gateway and all target nodes in a non-native network are connected to a unique connection network, wherein said connection network indicator is stored in an unused address in an IP reverse address table.

4. A method as in claim 3, wherein said unused address is address 127.0.0.4 in the IP reverse address table.

5. A method of accessing one or more dependent Logical Units (LUs) in a non-SNA network, from one or more LUs on an SNA network, such that each said dependent LU can be reached through an SNA over TCP/IP gateway, said method comprising:

establishing a fictitious connection network name;

associating said fictitious connection network with the non-SNA network;

associating each Dependent Logical Unit DLU in the non-SNA network with said fictitious connection network name;

establishing a session, through the gateway, between said one or more dependent LUs and said one or more LUs on the SNA network;

mapping each said dependent Logical Unit twice, each mapping represented as an entry, said entries referred to as a first entry and a second entry;

said first entry mapping said dependent LU to its IP address; and said second entry mapping the dependent LU to a predetermined, arbitrarily chosen invalid, IP address which signifies that the LU is dependent.

6. A method of determining whether a particular LU in an Multi Protocol Transport Networking MPTN network is dependent, said method comprising the steps of:

determining whether said LU is mapped to a unique, predetermined address in a reverse address table, indicating that said LU is dependent if mapped to said unique predetermined address.

7. A method as claimed in claim 6 wherein said unique, predetermined address in the reverse address table is IP address 127.0.0.2.

8. A method of mapping one or more dependent Logical Units (LUs) enabling each said dependent LU to be reached through an SNA over TCP/IP gateway, said method comprising:

mapping in the gateway each said dependent LU twice, each mapping represented as an entry, said entries referred to as a first entry and a second entry;

said first entry mapping said dependent LU to its IP address; and said second entry mapping the dependent LU to IP address 127.0.0.2, which signifies that the LU is dependent.

9. A method of routing information from an SNA/APPN network having standard APPN LOCATE functions through a gateway and across one or more non-native networks to a target node wherein said fictitious control point name is stored in an unused address location in an IP reverse address table, said method comprising the steps of:

is establishing a unique, fictitious APPN node having a control point name for each non-native network attached through said gateway;

utilizing the standard APPN LOCATE functions to locate said target node utilizing said fictitious APPN node control point name to route information to said target node via said gateway and through at least one of said non-native networks to reach said target node; and indicating that each said gateway and all target nodes in a non-native network are connected to a unique connection network.

* * * * *